United States Patent
Chen

(10) Patent No.: US 11,627,386 B2
(45) Date of Patent: Apr. 11, 2023

(54) INFORMATION CAPTURING DEVICE AND STARTING METHOD OF INFORMATION CAPTURING DEVICE

(71) Applicant: Getac Technology Corporation, Hsinchu County (TW)

(72) Inventor: Min-Tai Chen, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 17/401,456

(22) Filed: Aug. 13, 2021

(65) Prior Publication Data

US 2022/0132012 A1 Apr. 28, 2022

(30) Foreign Application Priority Data

Oct. 23, 2020 (CN) .......................... 202011146721.5

(51) Int. Cl.
*H04N 5/232* (2006.01)
*G01S 19/01* (2010.01)
*H04N 23/60* (2023.01)

(52) U.S. Cl.
CPC ............ *H04N 23/60* (2023.01); *G01S 19/01* (2013.01)

(58) Field of Classification Search
CPC .............................. H04N 5/232; G01S 19/01
USPC ......................................................... 348/158
See application file for complete search history.

(56) References Cited

U.S. PATENT DOCUMENTS

| | | | |
|---|---|---|---|
| 2015/0050003 A1* | 2/2015 | Ross .................... | G11B 31/006 386/223 |
| 2016/0182850 A1* | 6/2016 | Thompson .............. | H04L 65/61 348/158 |
| 2018/0295410 A1* | 10/2018 | Shinozaki ............ | H04N 21/436 |

* cited by examiner

*Primary Examiner* — John W Miller
*Assistant Examiner* — Omer Khalid
(74) *Attorney, Agent, or Firm* — Locke Lord LLP; Tim Tingkang Xia, Esq.

(57) ABSTRACT

An information capturing device includes a setting storage unit, a positioning unit, an audiovisual recording unit and a control unit. The setting storage unit stores a fence setting of a hotspot. The positioning unit, coupled to the setting storage unit, detects a current position, determines whether the current position is within a first geographic boundary defined by the fence setting, and outputs an activation notification when the current position is within the first geographic boundary. The control unit, coupled to the positioning unit and the audiovisual recording unit, activates the audiovisual recording according to the activation notification to perform audiovisual recording so as to capture environmental data.

4 Claims, 3 Drawing Sheets

INFORMATION CAPTURING DEVICE AND STARTING METHOD OF INFORMATION CAPTURING DEVICE

CROSS-REFERENCE TO RELATED PATENT APPLICATION

The application claims priority to a Chinese Patent Application No. 202011146721.5, filed on Oct. 23, 2020, the disclosure of which is also hereby incorporated by reference herein in its entirety.

BACKGROUND OF THE INVENTION

Field of the Invention

The present invention relates to the technology of an information capturing device, and more particularly to an information capturing device and a starting method of an information capturing device.

Description of the Prior Art

A current police body-worn camera (BWC) needs a police officer to manually press a start button in order to activate a video recording function, or requires an activation signal transmitted by a controller mounted in a police vehicle or a real-time crime center (RTCC) in order to activate a video recording function.

In certain situations, for example, police confrontation or suspect pursuit, a police officer under such type of emergency may not have sufficient time, mindset or effort to activate a video recording function. In other cases, in sudden encounters of crime events, the need of first activating a recording function at a first reaction instant may jeopardize the safety of the police officer or even the general public.

SUMMARY OF THE INVENTION

In one embodiment, a starting method of an information capturing device includes detecting a current position of the information capturing device, determining whether the current position is within a first geographic boundary of a hotspot, activating an audiovisual recording unit of the information capturing device when the current position is within the first geographic boundary so as to capture environmental data, and not activating the audiovisual recording unit when the current position is not within the first geographic boundary.

In one embodiment, an information capturing device includes a setting storage unit, a positioning unit, an audiovisual recording unit and a control unit. The setting storage unit stores a fence setting of a hotspot. The positioning unit, coupled to the setting storage unit, detects a current position, determines whether the current position is within a first geographic boundary defined by the fence setting, and outputs an activation notification when the current position is within the first geographic boundary. The control unit, coupled to the positioning unit and the audiovisual recording unit, activates the audiovisual recording unit according to the activation notification to perform audiovisual recording so as to capture environmental data.

In conclusion of the above, the information capturing device and the starting method of an information capturing device according to any of the embodiments are capable of automatically activating an audiovisual recording function when the information capturing device enters a hotspot.

DETAILED DESCRIPTION OF THE EMBODIMENTS

Figure 1:
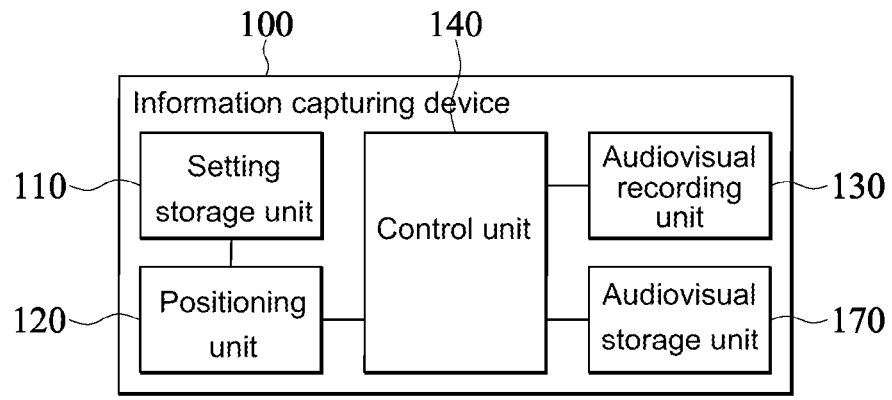
FIG. 1 is a brief schematic block diagram of an information capturing device according to an embodiment.

FIG. 1 shows a brief schematic block diagram of an information capturing device according to an embodiment. Referring to FIG. 1, an information capturing device 100 includes a setting storage unit 110, a positioning unit 120, an audiovisual recording unit 130 and a control unit 140. The positioning unit 120 is coupled to the setting storage unit 110, and the control unit 140 is coupled to the positioning unit 120 and the audiovisual recording unit 130. In some embodiments, the information capturing device 100 may be, for example but not limited to, a police body-worn camera (BWC), a sports camera and a wearable video recorder.

The setting storage unit 110 is configured to store one or more sets of fence settings of hotspots (i.e., places of interest). In other words, each hotspot can be represented by one set of fence settings. The setting storage unit 110 is configured to store in advance the fence settings of each hotspot according to one or more places (i.e., hotspots) to be monitored by the information capturing device 100. In some embodiments, the fence settings may be defined by a built-in geofencing function of a Global Positioning System (GPS). The fence settings can be received by an input interface provided by the GPS and be further stored in the setting storage unit 110. In some embodiments, the setting storage unit 110 may be implemented by a memory.

The audiovisual recording unit 130 is configured to record videos and record audios so as to capture environmental data of a current position. In some embodiments, the audiovisual recording unit 130 may be implemented by an audiovisual input apparatus including a camera lens and/or a microphone.

Figure 2:
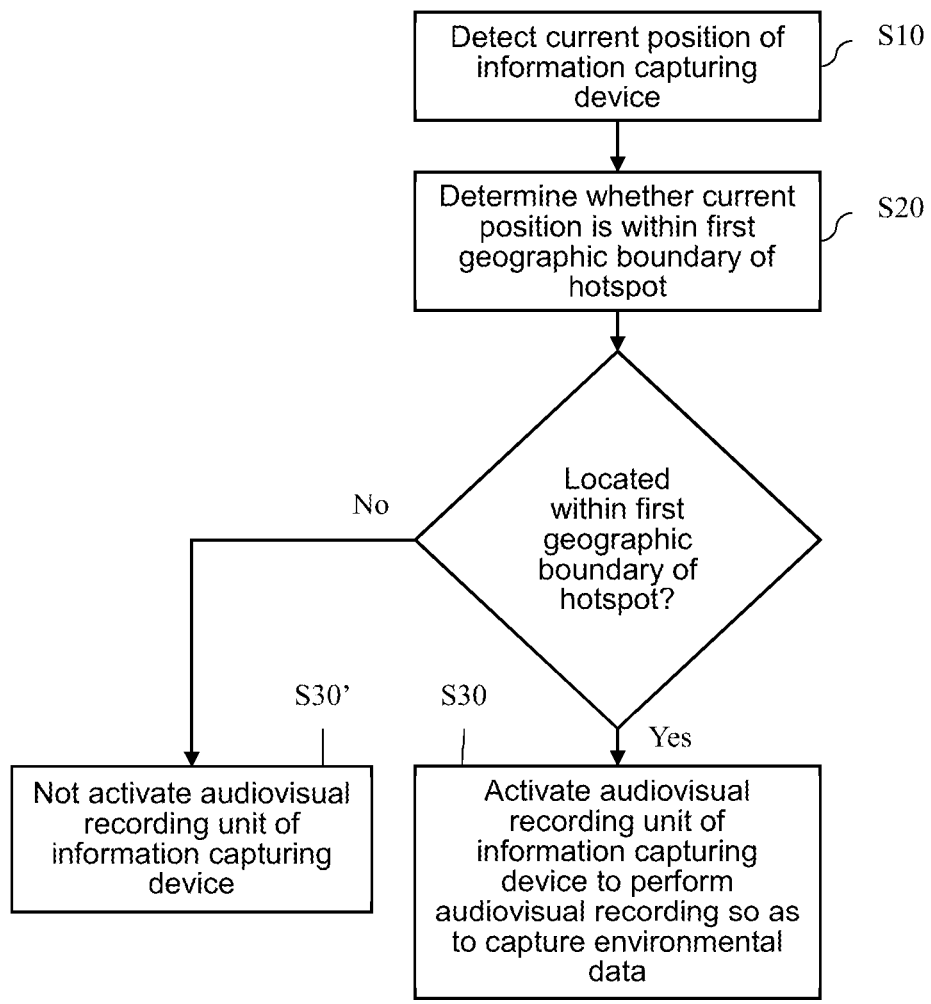
FIG. 2 is a schematic flowchart of a starting method of an information capturing device according to a first embodiment.

Referring to FIG. 1 and FIG. 2, the positioning unit 120 is capable of detecting a current position of the information capturing device 100 (step S10), and determining whether the current position is within a first geographic boundary defined by the fence settings stored in the setting storage unit 110 (step S20). In some embodiments, the fence setting may include a longitude value, a latitude value and a radius value, and the first geographic boundary is a circular region created based on the longitude value, the latitude value and the radius value (e.g., a circular region drawn by using the longitude value and the latitude value as a center and a first radius value as a radius). In some embodiments, the positioning unit 120 may be a GPS. In other words, the GPS obtains satellite signals through satellites and accordingly calculates information of the current position.

Herein, when the positioning unit 120 detects that the current position is within the first geographic boundary (that is, the information capturing device 100 has entered the hotspot), the positioning unit 120 outputs an activation notification to the control unit 140, such that the control unit 140 activates the audiovisual recoding unit 130 according to the activation notification to perform audiovisual recording so as to capture environmental data (step S30). In other words, when the position unit 120 detects that the current position is within the first geographic boundary, the audiovisual recording unit 130 is activated by the control unit 140 to capture data of video and audio of the environment of the current position. Conversely, when the positioning unit 120 detects that the current position is not within the first geographic boundary (that is, the information capturing device 100 has not entered the hotspot), the positioning unit 120 does not output the activation notification to the control unit 140, and the control unit 140 does not activate the audiovisual recording unit 130 (step 30'). Thus, the audiovisual recording unit 130 is kept in a current state, for example, does not perform audiovisual recording. In some embodiments, the control unit 140 may be implemented by a system-on-chip (SoC), a central processing unit (CPU), a microcontroller unit (MCU), an embedded controller (EC), an application-specific integrated circuit (ASIC), an application processor (AP), or another other electronic component having operation and processing capabilities.

More specifically, in one example, assuming that the information capturing device 100 is to monitor a hotspot, the setting storage unit 110 of the information capturing device 100 then stores a fence setting associated with this hotspot. When the positioning unit 120 detects that the current position of the information capturing device 100 is within the first geographic boundary defined by the fence setting, the positioning unit 120 issues an activation notification to the control unit 140, such that the control unit 140 activates the audiovisual recording unit 130. Conversely, when the positioning unit 120 detects that the information capturing device 100 is not within the first geographic boundary defined by the fence setting, the positioning unit 120 does not issue an activation notification to the control unit 140 such that the audiovisual recording unit 130 remains inactivated. In another example, assuming that the information capturing device 100 is to monitor multiple hotspots (taking two hotspots for instance, respectively referred to as a first hotspot and a second hotspot), the setting storage unit 110 of the information capturing device 100 then stores the fence settings of the first hotspot and the second hotspot. When the positioning unit 120 detects that the current position of the information capturing device 100 is within the first geographic boundary defined by the fence setting of the first hotspot or the first geographic boundary defined by the fence setting of the second hotspot, the positioning unit 120 issues an activation notification to the control unit 140, such that the control unit 140 activates the audiovisual recording unit 130. Conversely, when the positioning unit 120 detects that the information that the current position of the information capturing device 100 is not within the first geographic boundary defined by the fence setting of any of the hotspots, the positioning unit 120 does not issue an activation notification to the control unit 140 such that the audiovisual recording unit 130 remains inactivated.

Figure 3:
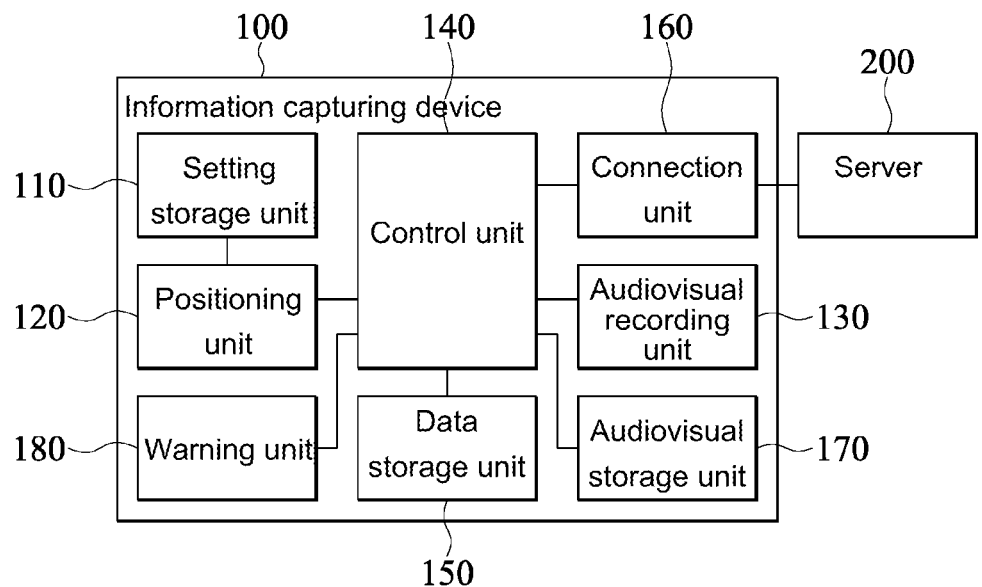
FIG. 3 is a brief schematic block diagram of an information capturing device according to some embodiments.

FIG. 3 shows a brief schematic block diagram of an information capturing device according to some embodiments. In some embodiments, referring to FIG. 3, the information capturing device 100 may further include a data storage unit 150 and a connection unit 160. The data storage unit 150 and the connection unit 160 are coupled to the control unit 140.

Herein, the data storage unit 150 is configured to store an identifier of the information capturing device 100. In other words, each information capturing device 100 has an identifier, and each identifier may correspond to fence settings of the same or different hotspots. In some embodiments, the identifier may be a unique identifier (UID) or an identification code of a police officer. In some embodiments, the data storage unit 150 may be implemented by a memory.

Figure 4:
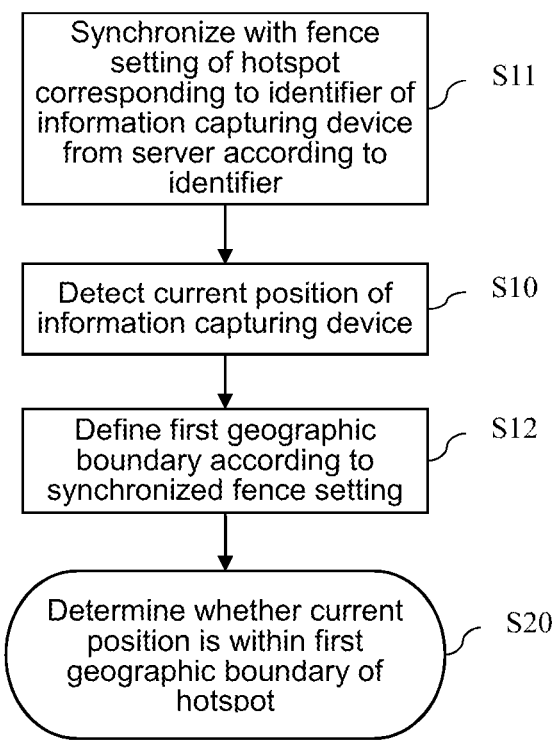
FIG. 4 is a partial schematic flowchart of a starting method of an information capturing device according to a second embodiment.

Referring to FIG. 3 and FIG. 4, the connection unit 160 is configured to connect to a server 200. In other words, the connection unit 160 may establish a communication connection in a wired or wireless manner with the server 200. In some embodiments, after the connection unit 160 establishes a communication connection with the server 200, the control unit 140 may further synchronize with the fence setting of the hotspot corresponding to the identifier from the server 200 through the connection unit 160 (step S11); in other words, the control unit 140 may update the fence setting of the hotspot stored in the setting storage unit 110 by the fence setting of the hotspot of the corresponding identifier in the server 200. Thus, the positioning unit 120 may define the first geographic boundary according to the synchronized fence setting (step S12) so as to further determine whether the current position is within the first geographic boundary (step S20). In some embodiments, when the information capturing device 100 is applied to a police BWC, the server 200 stores the fence setting of crime hotspots (i.e., hotspots) generated by an operation of historical crime data (e.g., data of positions tagged by audiovisual files uploaded to the server 200). When the information capturing device 100 is connected to the server 200 through the connection unit 160, the connection unit 140 sends an update request on the basis of the identifier stored in the data storage unit 100 to the server 200. The server 200 learns from the received update request the identifier of the connected information capturing device 100, and returns the fence setting of the crime hotspot corresponding to this identifier to the information capturing device 100, such that the control unit 140 of the information capturing device 100 receives and stores the fence setting of the corresponding crime hotspot in the setting storage unit 110. In some embodiments, the connection unit 160 may be, for example but not limited to, a connection port (e.g., USB) of a wired network, a Wi-Fi hotspot module or a Bluetooth module.

In some embodiments, while the audiovisual recording unit 130 performs audiovisual recording (i.e., after step S30), the user may manually turn off the audiovisual recording unit 130, for example, pressing a stop button to stop audiovisual recording of the audiovisual recording unit 130. Once audiovisual recording stops, the audiovisual recording unit 130 forms an audiovisual file from the captured environmental data.

Figure 5:
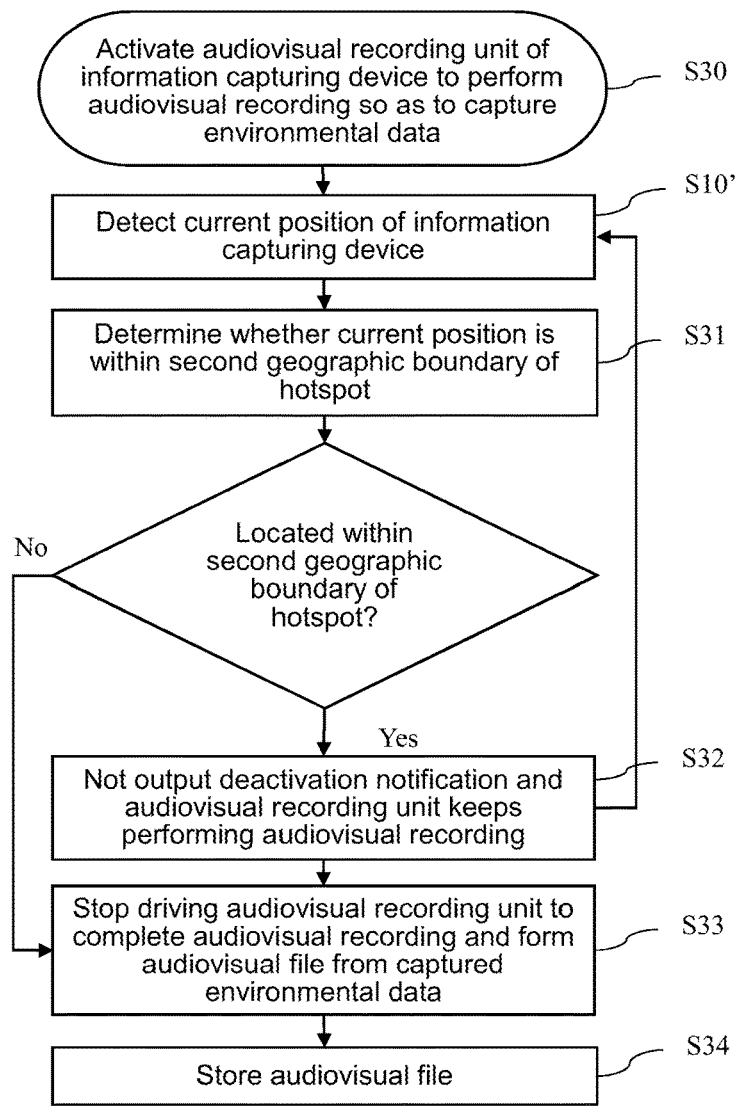
FIG. 5 is a partial schematic flowchart of a starting method of an information capturing device according to a third embodiment.

Referring to FIG. 3 and FIG. 5, in some embodiments, while the audiovisual recording unit 130 performs audiovisual recording (i.e., after step S30), the information capturing device 100 may also automatically stop audiovisual recording of the audiovisual recording unit 130 by determining the current position. Herein, the setting storage unit 110 stores a second geographic boundary defined by the fence settings of hotspots, and the second geographic boundary is greater than the first geographic boundary. In some embodiments, the fence setting may include a longitude value, a latitude value, a first radius value and a second radius value, and the second radius value is greater than the first radius value. The first geographic boundary is a circular region created on the basis of the longitude value, the latitude value and the first radius value (e.g., a circular region drawn using the longitude value and the latitude value as a center and the first radius value as a radius), and the second geographic boundary is a circular region created on the basis of the longitude value, the latitude value and the second radius value (e.g., a circular region drawn using the longitude value and the latitude value as a center and the second radius value as a radius).

While the audiovisual recording unit 130 performs audiovisual recording (i.e., after step S30), the positioning unit 120 continues detecting the current position of the information capturing device 100 (step S10'), and determines whether the current position is within the second geographic boundary of the hotspot (step S31). When the current position that is newly detected by the positioning unit 120 is not within the second geographic boundary (that is, the information capturing device 100 has left the hotspot), the positioning unit 120 outputs a deactivation notification to the control unit 140, and the control unit 140 stops the audiovisual recording unit 130 according to the deactivation notification to complete audiovisual recording, such that the audiovisual recording unit 130 forms an audiovisual file from the captured environmental data (step S33). Referring to FIG. 3 and FIG. 5, in some embodiments, the information capturing device 100 may further include an audiovisual storage unit 170, and the audiovisual storage unit 170 is coupled to the audiovisual recording unit 130 and the control unit 140. Once the audiovisual recording unit 130 has formed the audiovisual file (step S33), the control unit 140 is configured to store the formed audiovisual file in the audiovisual storage unit 170 (step S34). The audiovisual storage unit 170 may be implemented by a memory.

Conversely, when the newly detected current position is within the second geographic boundary (that is, the information capturing device 100 is still at the hotspot), the positioning unit 120 does not output a deactivation notification to the control unit 140, and the audiovisual recording unit 130 keeps performing audiovisual recording (step S32).

More specifically, in one example, assuming that the information capturing device 100 is to monitor one hotspot, the setting storage unit 110 of the information capturing device 100 stores a fence setting of this hotspot. When the current position of the information capturing device 100 is within the first geographic boundary defined by the fence setting, the audiovisual recording unit 130 is in an activated state. When the positioning unit 120 detects that the current position of the information capturing device 100 is not within the first geographic boundary defined by the fence setting but the current position is within the second geographic boundary of the fence setting, the positioning unit 120 does not issue a deactivation notification to the control unit 140, and the control unit 140 keeps driving the audiovisual recording unit 130. Conversely, when the positioning unit 120 detects that the current position of the information capturing device 100 is not within the second geographic boundary defined by the fence setting, the positioning unit 120 outputs a deactivation notification to the control unit 140, and the control unit 140 deactivates the audiovisual recording unit 130 according to the deactivation notification. In other words, the fence setting of the hotspot defines the first geographic boundary and the second geographic boundary, the first geographic boundary partially overlaps with the second geographic boundary, and the second geographic boundary is greater than the first geographic boundary. Setting the second geographic boundary to be greater than the first geographic boundary provides a buffer margin for deactivating the audiovisual recording unit 130, hence preventing loss of the environmental data from occurring at the border of the first geographic boundary.

Figure 6:
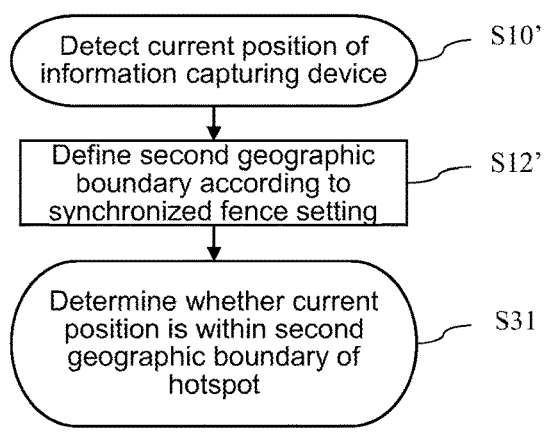
FIG. 6 is a schematic flowchart of step S10 according to the second embodiment in FIG. 2.

Referring to FIG. 2 and FIG. 6, in some embodiments, the control unit 140 synchronizes with the fence setting of the hotspot corresponding to the identifier from the server 200 through the connection unit 160 (step S11); in other words, the control unit 140 is capable of updating the fence setting of the hotspot stored in the setting storage unit 110 from the fence setting of the hotspot corresponding to the identifier in the server 200. Thus, the positioning unit 120 is capable of defining the first geographic boundary according to the synchronized fence setting (step S12), so as to further determine whether the current position is within the first geographic boundary (step S20). After the audiovisual recording unit 130 performs audiovisual recording, the positioning unit 120 is capable of further defining the second geographic boundary according to the synchronized fence setting (step S12'), so as to further determine whether the current position is within the second geographic boundary (step S31). Herein, the second geographic boundary is greater than and partially overlaps with the first geographic boundary.

Referring to FIG. 3, in some embodiments, the information capturing device 100 further includes a warning unit 180, which is coupled to the control unit 140. When the control unit 140 activates the audiovisual recording unit 130 according to the received activation notification, the control unit 140 simultaneously outputs a warning notification so as to drive the warning unit 180 to generate a warning message. In some embodiments, the warning unit 180 may be, for example, a light-emitting diode (LED), a beeper, a vibrator or a display screen. When the audiovisual recording unit 130 is activated, the control unit 140 drives the warning unit 180 to issue a sound, flicker, vibrate or display a warning message so as to indicate that the audiovisual recording unit 130 has been activated.

Moreover, each of the setting storage unit 110, the data storage unit 150 and the audiovisual storage unit 170 may be implemented by a memory, which may be, for example but not limited to, a volatile memory or a non-volatile memory such as a dynamic random access memory (DRAM), a static random access memory (SRAM), a read-only memory (ROM), a programmable read-only memory (PROM), an erasable programmable read-only memory (EPROM), an electrically-erasable programmable read-only memory (EEPROM), a hard disk drive (HDD) or a solid-state driver (SSD).

In conclusion of the above, in some embodiments, the information capturing device 100 and the starting method of an information capturing device are capable of providing an automatic recording mechanism based on a hotspot of the information capturing device, such that audiovisual recording is automatically activated when the information capturing device enters the hotspot, thereby resolving the issue of being unable to activate a recording function initiatively or by others in an emergency. In some embodiments, the information capturing device 100 is capable of utilizing a fence setting of a hotspot synchronous with the server 200 according to an identifier, so as to set the automatic monitoring range of each information capturing device 100. In some embodiments, the information capturing device 100 is further capable of determining the stop timing of recording based on the second geographic boundary, such that recording is automatically deactivated when the information capturing device 100 leaves the hotspot. Herein, the second geographic boundary is greater than and partially overlaps with the first geographic boundary, thereby providing a buffer margin for deactivating recording of the information capturing device 100, hence preventing loss of the environmental data from occurring at the border of the first geographic boundary.

While the invention has been described by way of example and in terms of the embodiments, it is to be understood that the invention is not limited thereto. Modifications and similar arrangements and procedures can be made by a person skilled in the art without departing from the spirit and scope of the present invention. Therefore, the scope of the appended claims should be accorded with the broadest interpretation so as to encompass all such modifications and similar arrangements and procedures.

What is claimed is:

1. A starting method of an information capturing device, comprising:
    detecting a current position of the information capturing device;
    determining whether the current position is within a first geographic boundary of a hotspot;
    when the current position is within the first geographic boundary, activating an audiovisual recording unit of the information capturing device to perform audiovisual recording so as to capture environmental data;
    when the current position is not within the first geographic boundary, not activating the audiovisual recording unit;
    after the audiovisual recording unit performs the audiovisual recording, determining whether the current position that is newly detected is within a second geographic boundary of the hotspot, wherein the second geographic boundary is greater than the first geographic boundary;
    when the currently position that is newly detected is not within the second geographic boundary, stopping driving the audiovisual recording unit so complete the audiovisual recording, and forming an audiovisual file from the captured environmental data;
    when currently position that is newly detected is within the second geographic boundary, maintaining the audiovisual recording of the audiovisual recording unit; and
    synchronizing with a fence setting of the hotspot corresponding to an identifier of the information capturing device from a server according to the identifier, wherein the fence setting comprises a longitude value, a latitude value, a first radius value and a second radius value greater than the first radius value, the first geographic boundary is defined by the longitude value, the latitude value and the first radius value, and the second geographic boundary is defined by the longitude value, the latitude value and the second radius value.

2. An information capturing device, comprising:
    a setting storage unit, storing a fence setting of a hotspot;
    a positioning unit, coupled to the setting storage unit, detecting a current position, determining whether the current position is within a first geographic boundary defined by the fence setting, and outputting an activation notification when the current position is within the first geographic boundary;
    an audiovisual recording unit;
    a control unit, coupled to the positioning unit and the audiovisual recording unit, activating the audiovisual recording unit according to the activation notification to perform audiovisual recording so as to capture environmental data;
    a data storage unit, coupled to the control unit, storing an identifier; and
    a connection unit, coupled to the control unit, configured to connect to a server;
    wherein while the audiovisual recording unit performs the audiovisual recording, the positioning unit further determines whether the current position that is newly detected is within a second geographic boundary of the hotspot, wherein the second geographic boundary is greater than the first geographic boundary;
    wherein when the current position that is newly detected is not within the second geographic boundary, the positioning unit outputs a deactivation notification, and the control unit stops the audiovisual recording unit according to the deactivation notification to complete the audiovisual recording, such that the audiovisual recording unit forms an audiovisual file from the captured environmental data; and
    wherein when the current position that is newly detected is within the second geographic boundary, the positioning unit does not output the deactivation notification;
    wherein the control unit further synchronizes with the fence setting of the hotspot corresponding to the identifier from the server through the connection unit, the fence setting comprises a longitude value, a latitude value, a first radius value and a second radius value greater than the first radius value, the first geographic boundary is defined by the longitude value, the latitude value and the first radius value, and the second geographic boundary is defined by the longitude value, the latitude value and the second radius value.

3. The information capturing device according to claim 2, further comprising:
    an audiovisual storage unit, coupled to the audiovisual recording unit and the control unit, configured to store the audiovisual file.

4. The information capturing device according to claim 2, further comprising:
    a warning unit, coupled to the control unit;
    wherein, when the control unit activates the audiovisual recording unit according to the activation notification, the control unit simultaneously outputs a warning notification to drive the warning unit to generate a warning message.

* * * * *